United States Patent [19]

Blidung et al.

[11] 4,220,236
[45] Sep. 2, 1980

[54] APPARATUS FOR CONVEYING AND TEMPORARY STORAGE OF CIGARETTE PACKS OR THE LIKE

[75] Inventors: Otto Blidung, Geesthacht; Gerhard Tolasch, Wentorf, both of Fed. Rep. of Germany

[73] Assignee: Hauni-Werke Körber & Co. KG, Hamburg, Fed. Rep. of Germany

[21] Appl. No.: 971,527

[22] Filed: Dec. 20, 1978

[30] Foreign Application Priority Data

Jan. 7, 1978 [DE] Fed. Rep. of Germany ....... 2800570

[51] Int. Cl.³ .............................................. B65G 1/00
[52] U.S. Cl. .................................................. 198/347
[58] Field of Search ................... 414/222; 198/347; 131/21 R, 21 B, 25

[56] References Cited
U.S. PATENT DOCUMENTS

3,499,555  3/1970  Wahle ................................. 198/347
4,170,285  10/1979  Hinchcliffe ....................... 198/347

Primary Examiner—Robert G. Sheridan
Attorney, Agent, or Firm—Peter K. Kontler

[57] ABSTRACT

A storing unit with a series of discrete and separately operable magazines is adjacent to the path of cigarette packs which are transported by a conveyor from a packing to a processing machine. First blocking devices are located downstream of those sections of the path which are adjacent to the magazines, a second blocking device is installed ahead of the foremost magazine, and a third blocking device is installed ahead of the second blocking device. When a magazine is to receive a row of packs, the corresponding first blocking device is moved into the path together with the second blocking device whereby the latter intercepts the oncoming packs and is removed from the path when the number of intercepted packs matches a preselected number. The thus obtained group is thereupon permitted to advance toward that first blocking device which extends into the path. At the same time, the third blocking device intercepts packs ahead of the second blocking device. The same procedure is repeated until the selected first blocking device accumulates a relatively long row of packs which are thereupon lifted off the conveyor and introduced into the corresponding magazine. The third blocking device is retracted when the second blocking device extends into the path, and vice versa. The magazines return long rows of packs into the corresponding sections of the path when the requirements of the processing machine exceed the output of the packing machine.

14 Claims, 5 Drawing Figures

APPARATUS FOR CONVEYING AND TEMPORARY STORAGE OF CIGARETTE PACKS OR THE LIKE

CROSS-REFERENCE TO RELATED APPLICATION

Certain features of the apparatus of the present invention are disclosed in our commonly owned copending application Ser. No. 881,822 filed Feb. 27, 1978 for "APPARATUS FOR PROCESSING BISCUITS OR THE LIKE", now U.S. Pat. No. 4,161,094.

BACKGROUND OF THE INVENTION

The present invention relates to apparatus for manipulating discrete commodities, such as cigarette packs or the like, and more particularly to improvements in accumulators or storing units for temporary storage of commodities between a supplying machine and a processing or consuming machine. Still more particularly, the invention relates to improvements in storing units or accumulators for temporary storage of one or more groups (e.g., rows) of discrete commodities in order to compensate for differences between the output of a producing or supplying machine and the requirements of a processing or consuming machine.

Accumulators or storing units of the class to which the present invention pertains are disclosed, for example, in commonly owned U.S. Pat. No. 3,499,555 to Wahle and in U.S. Pat. No. 3,939,984 to Butner et al. The patented apparatus are designed for temporary storage of cigarette packs, i.e., for storage of commodities whose dimensions almost invariably match or at least closely approximate a prescribed norm. Therefore, the patented apparatus can be operated properly by resorting to relatively simple controls which initiate the transfer of groups of packs from a conveyor (which normally delivers packs from a supplying machine to a processing machine) into the storing unit or the transfer of groups of packs from the storing unit back onto the conveyor. In order to transfer a group of packs into the storing unit, it is necessary to arrest a pack and to allow a certain number of packs to accumulate therebehind. A transfer device thereupon moves a selected number of intercepted packs into the storing unit. The length of the transfer device can be selected with a high degree of accuracy for the aforediscussed reason, namely, because the combined length of two, three or more aligned cigarette packs is always the same or deviates from the required length by a small fraction of an inch. For the same reason, the racks, shelves or like storing devices in the storing unit can be loaded to capacity because each shelf receives a predetermined number of aligned packs whose combined length is known. All that is necessary is to provide a stop which is held in a predetermined position with respect to the conveyor for packs and to move such stop into the path of an oncoming pack whereby the next-following packs pile up behind the arrested pack to form a row from which the transfer device removes groups consisting of predetermined numbers of packs, one group after the other, until the cause of malfunction of the processing machine is eliminated or the storing unit is filled to capacity. The transfer of groups of packs from the storing unit onto the conveyor is just as simple as or even simpler than the introduction of groups of packs into the storing unit; such transfer takes place when the supplying machine cannot satisfy the requirements of the processing machine.

OBJECTS AND SUMMARY OF THE INVENTION

An object of the invention is to provide an apparatus (hereinafter called storing unit or accumulator) whose versatility exceeds the versatility of heretofore known storing units in that it is capable of storing or removing from storage groups of commodities whose dimensions may and often do deviate from a prescribed norm.

Another object of the invention is to provide a storing unit which can be readily and rapidly converted for storage of longer, shorter, wider or narrower commodities.

A further object of the invention is to provide a fully automatic storing unit which is always ready to accept surplus commodities to thus allow for continuous operation of a supplying machine when the processing machine is temporarily out of commission.

An additional object of the invention is to provide a novel and improved control system for a storing unit of the above outlined character.

Another object of the invention is to provide a storing unit which can be installed between existing supplying and processing machines as a superior (especially more versatile) substitute for heretofore known storing units.

A further object of the invention is to provide the storing unit with novel and improved means for assembling groups (e.g., rows) of commodities prior to introduction into a selected magazine of the storing unit.

An ancillary object of the invention is to provide the control system of the storing unit with novel and improved means for monitoring the commodities on the conveyor which delivers such commodities from the supplying machine to the processing machine.

The invention is embodied in an apparatus for temporary storage of rows of discrete commodities which are transported by a conveyor in a predetermined direction along a predetermined path from a supplying station (e.g., a station accommodating a packing machine for cigarettes) to a processing station (e.g., a station which accommodates a baling or carton filling machine). The apparatus comprises a storing unit having at least one magazine which is adjacent to a predetermined section of the path and includes means (e.g., pairs of endless conveying elements disposed at the opposite sides of the path) for transferring rows of commodities from and back into the aforementioned section of the path, a first blocking device which is located at the downstream end of the aforementioned section (as considered in the direction of transport of commodities along the path) and is movable into and from the path to intercept an oncoming commodity whereby the next-following commodities pile up behind the intercepted commodity to form a row which is thereupon transferred into the magazine when the output of the machine at the supplying station exceeds the requirements of the machine at the processing station, a second blocking device which is located ahead of the aforementioned section and is movable into the path to intercept an oncoming commodity whereby the next-following commodities pile up behind the commodity which is intercepted by the second blocking device, a third blocking device located ahead of the second blocking device and movable into the path to arrest an oncoming commodity, a set of discrete sensors or analogous means for counting the number of commodites which are piled up by the second blocking device, and means (e.g., computer-controlled electromagnets) for simultaneously moving the second and third blocking devices from and into the path when the number of commodities which are piled up by the second blocking device reaches a predetermined number so that the conveyor is free to transport the piled up commodities beyond the second and toward the first blocking device while the third blocking device prevents commodities from advancing toward the second blocking device. This enables the apparatus to accumulate a relatively long row of commodities which are held in the aforementioned section of the path by the first blocking device preparatory to transfer into the magazine. When the requirements of the machine at the processing station exceed the output of the machine at the supplying station, the magazine is caused to deliver one or more rows of commodites into the aforementioned section of the path while the first blocking device is held in the inoperative position so that the thus delivered rows can be transported toward the processing station.

The commodities which are delivered by the machine at the supplying station are normally separated from each other by gaps having a width which suffices for entry of a blocking device into the path. Such gaps are monitored by photocells or other suitable signal generating detectors which are located ahead of the blocking devices and initiate the movement of corresponding blocking devices into the path when a gap between two neighboring commodities is in register with the respective blocking device.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
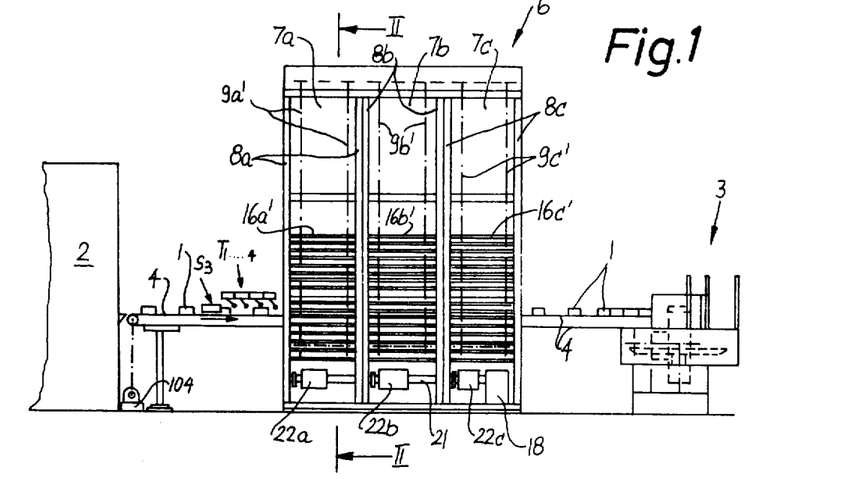
FIG. 1 is a side elevational view of an apparatus which embodies the improved storing unit.

FIG. 1 shows a storing unit or accumulator 6 which is disposed between an article-supplying machine 2 at a first station and an article receiving and processing machine 3 at a second station. The articles 1 which are transported from the outlet of the supplying machine 2 to the inlet of processing machine 3 are assumed to be cigarette packs, i.e., the supplying machine may constitute a packer for blocks of cigarettes which are inserted into soft or hard envelopes, e.g., into hard envelopes having so-called flip-tops or hinge lids. The processing machine 3 may constitute a bundle packer or an apparatus which introduces predetermined numbers of cigarette packs into cartons or analogous receptacles. The means for transporting packs 1 from the machine 2 to the machine 3 includes an endless belt conveyor 4 whose upper reach receives discrete packs at intervals so that the packs are normally separated from each other by clearances or gaps best shown between the storing unit 6 and the supplying machine 2 of FIG. 1.

The purpose of the storing unit 6 is to accept rows of packs 1 from the upper reach of the conveyor 4 when the output of the supplying machine 2 exceeds the requirements of the processing machine 3 or to deliver rows of packs 1 onto the upper reach of the conveyor 4 when the output of the supplying machine 2 is too low. This also includes situations when the machine 2 or 3 is idle, e.g., when the processing machine 3 is ready to accept and process packs 1 but the output of the supplying machine 2 is zero.

Figure 2:
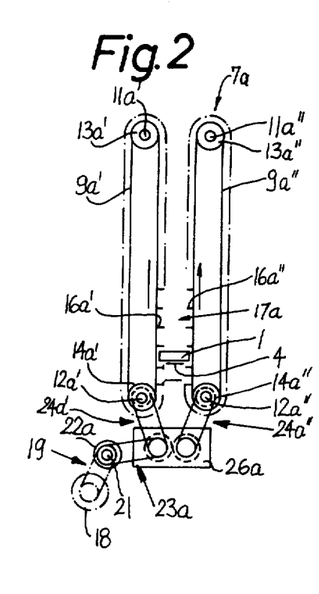
FIG. 2 is a transverse vertical sectional view of a magazine as seen in the direction of arrows from the line II—II of FIG. 1.

The illustrated storing unit 6 comprises several discrete magazines 7a, 7b and 7c whose frames 8a, 8b and 8c are secured to each other by screws, bolts or other suitable fastener means, not shown. It is clear that the number of magazines can be reduced to two (or even one) or increased to four or more. These magazines are disposed one behind the other, as considered in the direction of travel of packs 1 along the path which is defined by the upper reach of the conveyor 4. The details of the first or foremost magazine 7a are shown in FIG. 2. The construction of the magazines 7b and 7c is preferably identical with that of the magazine 7a; therefore, all such parts of the magazines 7b and 7c which are identical with or clearly analogous to corresponding parts of the magazine 7a are denoted by similar reference numerals followed by the letter "b" or "c". In the following description, the reference characters which are shown in parentheses denote those parts of the magazine 7b and/or 7c which are identical with the similarly referenced parts of the fully illustrated magazine 7a but are not specifically shown in the drawing.

The magazine 7a of FIGS. 1 and 2 comprises a first mobile carrier including a pair of parallel endless toothed conveying elements or belts 9a' at one side and a second mobile carrier including a pair of parallel endless toothed conveying elements or belts 9a" at the other side of the respective portion of the conveyor 4. The inner and outer reaches of the belts 9a' and 9a" are vertical, and their inner reaches respectively carry spaced-apart horizontal rungs or platforms 16a', 16a". Each platform 16a' is coplanar with but spaced apart from a platform 16a", and the distance between such coplanar platforms 16a', 16a" is less than the width of a pack 1 (as considered at right angles to the direction of transport of packs by the upper reach of the conveyor 4). It will be noted that the width of the conveyor 4 is less than the width of a pack or the distance between two coplanar platforms 16a', 16a". Each pair of such coplanar platforms constitutes or defines a pocket or receptacle 17a for a row of aligned packs 1.

The belts 9a' are trained over upper and lower sprocket wheels 13a', 14a' which are respectively mounted on parallel horizontal shafts 11a', 12a'. Analogously, the belts 9a" are trained over upper and lower sprocket wheels 13a", 14a" which are respectively mounted on parallel horizontal shafts 11a", 12a". The distance between the belts 9a', 9a" and the dimensions of the platforms 16a', 16a" (as considered at right angles to the inner reaches of these belts) are such that the inner reaches of the belts 9a', 9a" can move up or down whereby the platforms 16a" and 16a" bypass the respective marginal portions of the conveyor 4.

Figure 3:
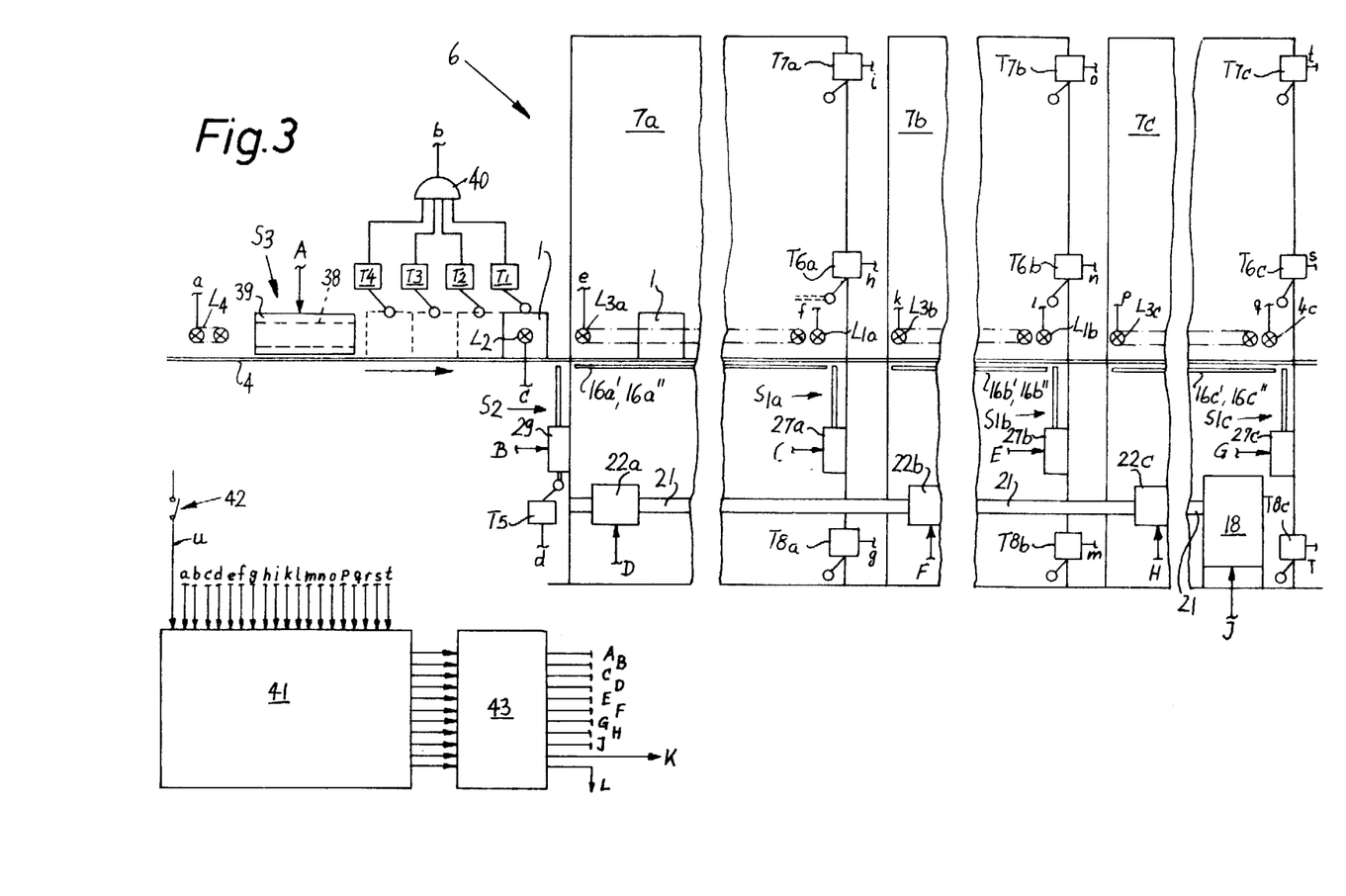
FIG. 3 is a diagrammatic view of a portion of the storing unit and of various monitoring and other components of the control system for the storing unit.

The means for moving the belts 9a', 9a" in stepwise fashion and in synchronism with each other to respectively move the pockets 17a upwardly away from or downwardly toward the upper reach of the conveyor 4 comprises a reversible prime mover 18 (e.g., a suitable electric motor) which transmits torque to a horizontal main shaft 21 through the medium of a chain drive 19. The main shaft 21 is long enough to transmit torque to moving parts of the magazines 7a, 7b and 7c (see FIG. 1). Signals for initiating rotation of the output element of the motor 18 in a clockwise or counterclockwise direction are transmitted by a control unit 41 which is shown in FIG. 3 and is preferably a commercially available miniature computer. Depending on the direction of rotation of the output element of the motor 18, the pockets 17a will move up or down, i.e., they will remove rows of packs 1 from the upper reach of the conveyor 4 for temporary storage in the magazine 7a or they deposit successive rows of temporarily stored packs 1 on the upper reach of the conveyor 4.

The main shaft 21 carries three friction clutches 22a, 22b, 22c, one of each of the magazines 7a-7c. The output elements of these friction clutches transmit torque to the respective sets of toothed belts 9a', 9a"; 9b', (9b"); 9c', (9c") via chain drives 23a (23b, 23c). The chain drive 23a receives motion from the output element of the friction clutch 22a and drives the input element of a reversing gear 26a which, in turn, drives the shafts 12a', 12a" via chain transmissions 24a', 24a". The parts (26b, 26c, 24b', 24b", 24c', 24c") which transmit torque from the friction clutches 22b, 22c to the lower shafts for the sprocket wheels of toothed belts in the magazines 7b and 7c are not specifically shown in the drawing.

The blocking and monitoring means for packs 1 on the conveyor 4 and in the magazines 7a-7c are shown in FIG. 3.

A first blocking device or stop (S1a, S1b, S1c) is adjacent to the downstream end of that conveyor section which extends through the respective magazines 7a, 7b, 7c. The stops S1a-S1c are respectively actuatable by electromagnets 27a, 27b, 27c and serve to pile up cigarette packs 1 on the upper reach of the conveyor 4 within the confines of the respective magazines. Thus, when the electromagnet 27a is energized to move the stop S1a into the path of oncoming cigarette packs 1, such packs accumulate on the conveyor 4 in the space between the chains 9a', 9a" of the first magazine 7a.

Figure 4:
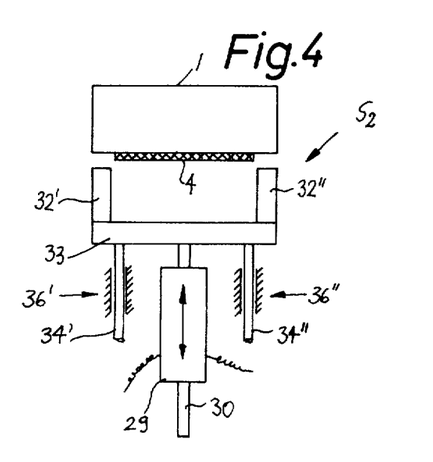
FIG. 4 is an enlarged front elevational view of a blocking device which is utilized in the apparatus of FIG. 1.

A single second blocking device or stop S2 is installed upstream of the foremost magazine 7a and is actuatable by an electromagnet 29 to cause the accumulation of packs 1 on the upper reach of the conveyor 4 ahead of the magazine 7a. The construction of the stop S2 is preferably identical with that of the stop S1a, S1b or S1c. Therefore, FIG. 4 merely shows the details of the stop S2 which is common to all three magazines but is installed ahead of the foremost magazine 7a. The stop S2 comprises two upright arms 32', 32" which are disposed at the opposite sides of the upper reach of the conveyor 4 and are secured to and extend upwardly from a horizontal crosshead or web 33 which is disposed transversely of the direction of transport of packs 1 toward the magazine 7a. The crosshead 33 is mounted on two upright follower pins 36', 36" which are reciprocable in stationary upright guides or ways 34', 34". The median portion of the crosshead 33 is connected to the armature 30 of the electromagnet 29. When the electromagnet 29 is deenergized, the crosshead 33 dwells in the illustrated lower end position and the upper end portions of the arms 32', 32" are located at a level below the path of movement of packs 1 with the upper reach of the conveyor 4. The crosshead 33 is moved upwardly in response to energization of the electromagnet 29 whereby the arms 32' and 32" enter the path of an oncoming pack 1 and arrest the latter so that the next-following packs are arrested by and pile up behind the pack which is held by the arms 32' and 32". The upper reach of the conveyor 4 then simply slides along the undersides of the arrested packs.

Figure 5:
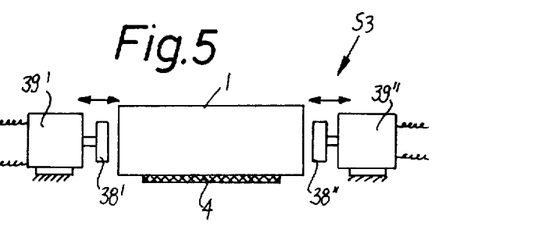
FIG. 5 is a similar enlarged view of a different blocking device.

A third blocking device or stop S3 is located ahead of the second stop S2. The distance between the stops S2 and S3 is a multiple of the length of a pack 1 (as considered in the direction of travel of packs toward the magazine 7a) plus the sum of eventual tolerances in the length of such packs but is only a small fraction (e.g., one third) of the length of that section of the conveyor 4 which extends through the magazine 7a, 7b or 7c. In the illustrated embodiment, the distance between the stops S2 and S3 exceeds four times the length of a single pack 1. The details of the stop S3 are shown in FIG. 5. This stop comprises two grippers or jaws 38', 38" which are disposed at the opposite sides of the upper reach of the conveyor 4 and are mounted at the level of lateral side faces of a pack 1 therebetween. The jaws 38', 38" are respectively reciprocable by electromagnets 39', 39". When the electromagnets 39', 39" are energized, the jaws 39', 39" move toward each other and grip at least one pack 1 therebetween. The means (e.g., suitable springs) for biasing the jaws 38', 38" away from each other so that the jaws release a pack 1 therebetween when the electromagnets 39', 39" are deenergized is not shown in FIG. 5. The same holds true for the means (e.g., a spring which urges the armature 30 of FIG. 4 downwardly) which serves to move the arms 32', 32" of the stop S2 to the illustrated retracted or inoperative positions.

The monitoring means of the improved apparatus comprises a first set of photocells L1a, L1b, L1c which are located slightly ahead or upstream of the respective first stops S1a-S1c and serve to detect the presence or absence of gaps between successive packs 1 on the upper reach of the conveyor 4. A similar monitoring means in the form of a photocell L2 is mounted slightly ahead of the second stop S2. The photocells L1a-L1c and L2 are mounted at a level above the upper reach of the conveyor 4 and their light sources direct light beams transversely across the respective portions of the path of movement of packs 1 toward the processing machine 3.

The monitoring means further comprises photocells L3a, L3b, L3c which respectively serve to detect the extent to which the sections of the upper reach of the conveyor 4 are occupied by packs 1 in the corresponding magazines 7a, 7b and 7c. The light sources of the photocells L3a-L3c are mounted in such a way that they direct light beams substantially diagonally across the spaces above the respective sections of the upper reach of the conveyor 4. Thus, each of these photocells can ascertain the presence of a row of packs 1 on the conveyor 4 within the confines of the respective magazine.

A further photocell L4 of the monitoring means is associated with the third stop S3 and its light source emits a light beam substantially diagonally across the path of oncoming packs 1 slightly ahead of the stop S3 to determine the presence or absence of gaps between successive packs. The inclination of the light beam which issues from the light source of the photocell L4 with respect to a direction which is normal to the direction of forward movement of packs 1 is such that the photocell L4 can detect the presence or absence of gaps having a predetermined minimum width.

The monitoring means further comprises a plurality of sensors T1, T2, T3, T4 which together constitute a counter and are mounted above the upper reach of the conveyor 4 between the stops S2 and S3 ahead of the photocell L2. The sensors T1-T4 ascertain the number of packs 1 which accumulate behind the stop S2 when the electromagnet 29 is energized to maintain the arms 32', 32" of the stop S2 in raised or operative positions. The sensors T1-T4 are connected to four discrete inputs of an AND gate 40 whose output is connected with the corresponding input of the computer 41 by conductor means b.

A further sensor T5 of the monitoring means is actuatable by the armature 30 of the electromagnet 29 and is connected to the corresponding input of the computer 41 by conductor means d.

Additional sensors T6a, T6b, T6c are installed in the magazines 7a, 7b, 7c in the path of movement of the respective platforms. Thus, the sensor T6a in the magazine 7a will be actuated by successive platforms 16a' and/or 16a", the sensor T6b will be actuated by successive platforms 16b' and/or 16b", and the sensor T6c will be actuated by successive platforms 16c' and/or 16c" (shown in FIG. 3). A selected platform 16a' or 16a" has a projection or trip (not specifically shown) which actuates a sensor T7a in the upper portion of the magazine 7a when the latter is filled to capacity. Similar sensors T7b, T7c are installed in the magazines 7b, 7c to be respectively actuated by the projection or trip of a selected platform 16b' (or 16b") or 16c' (or 16c"). The just discussed or other encoded platforms respectively actuate sensors T8a, T8b, T8c which are installed in the lower portions of the corresponding magazines 7a, 7b, 7c.

The reference characters a, b, c, d, e, f, g, h, i, k, l, m, n, o, p, q, r, s, t respectively denote conductor means which connect the components of monitoring means with the corresponding inputs of the computer 41 (some of these conductor means were mentioned above). A further input of the computer 41 is connected with conductor means u containing a switch 42 which is installed in or at the processing machine 3 and is actuated in response to stoppage of this machine to thereby transmit an appropriate signal to the computer. FIG. 3 shows that the conductor means a connects the computer 41 with the photocell L4, the conductor means b is connected with the output of the AND gate 40, the conductor means c is connected with the photocell L2, the conductor means d is connected with the sensor T5, the conductor means e with photocell L3a, the conductor means f with photocell L1a, the conductor means g with sensor T8a, the conductor means h with sensor T6a, the conductor means i with sensor T7a, the conductor means k with photocell L3b, the conductor means l with photocell L1b, the conductor means m with sensor T8b, the conductor means n with sensor T6b, the conductor means o with sensor T7b, the conductor means p with photocell L3c, the conductor means q with photocell L1c, the conductor means r with sensor T8c, the conductor means s with sensor T6c, and the conductor means t with sensor T7c.

The outputs of the computer 41 are connected with conductors A, B, C, D, E, F, G, H, J, K and L by way of an operational amplifier 43. The conductor A connects the computer 41 with the electromagnets 39', 39" of the stop S3, the conductor B with electromagnet 29 for the stop S2, the conductor C with electromagnet 27a, the conductor D with friction clutch 22a, the conductor E with electromagnet 27b, the conductor F with friction clutch 22b, the conductor G with electromagnet 27c, the conductor H with friction clutch 22c, the conductor J with motor 18, the conductor K with processing machine 3, and the conductor L with supplying machine 2. Signals which are transmitted via conductor K can regulate the output of the processing machine 3.

The aforedescribed components of the monitoring means transmit signals to the corresponding inputs of the computer 41 whereby the computer causes selected parts of the storing unit 6 to perform the following functions:

Signals which are respectively transmitted by photocells L1a, L1b, L1c initiate the energization of electromagnets 27a, 27b, 27c for the corresponding stops S1a, S1b, S1c. Analogously, the photocell L2 transmits signals for energization of the electromagnet 29 which controls the stop S2.

The photocells L3a, L3b, L3c respectively determine the timing of energization of friction clutches 22a, 22b, 22c during transfer of rows of packs 1 from the respective magazines 7a, 7b, 7c onto the upper reach of the conveyor 4.

When the photocell L4 detects a gap of appropriate width, it transmits a signal which causes the computer 41 to set up a program for transfer of packs 1 from the magazines 7a-7c onto the conveyor 4. This program (which will be described in detail hereinafter) involves activation of the photocell L3a, L3b or L3c and starting of the motor 18 in appropriate direction. When the photocell L4 fails to detect a gap of requisite width, the corresponding signal from the photocell L4 to the computer 41 selects, with a certain delay, a program for transfer of rows of packs 1 into the magazine 7a, 7b or 7c. Such program involves activation of the photocell L1a or L1b or L1c, activation of the photocell L2, activation of the sensors T1-T5 and starting of the motor 18 in appropriate direction so as to transfer successive rows of packs from the magazine 7a, 7b or 7c onto the upper reach of the conveyor 4. This second program, too, will be described in greater detail hereinafter. At the same time, the stops S2 and S3 are actuated to enable the stop S2 to accumulate groups or short rows of four packs 1 each. The sensor T5 transmits signals which enable the computer 41 to count the number of groups of packs which are delivered to the magazines 7a, 7b and 7c and to determine the timing of engagement of the friction clutch 22a, 22b or 22c. Signals from the sensors T6a, T6b, T6c serve to disengage the respective friction clutches 22a, 22b, 22c.

The sensors T7a, T7b and T7c respectively transmit signals which indicate that the corresponding magazines 7a, 7b and 7c are filled to capacity. These sensors select that magazine which is to receive or discharge rows of packs 1. During transfer of packs 1 from the conveyor 4, the magazine 7a is filled ahead of the magazine 7b, and the latter is filled ahead of the magazine 7c. During transfer of rows of packs 1 from the storing unit 6, the packs are withdrawn from the magazine 7c ahead of the magazine 7b and from the magazine 7b ahead of the magazine 7a. When each of the sensors T7a-T7c transmits a signal denoting that the corresponding magazine is filled to capacity, the computer 41 transmits a signal via conduit L to arrest the prime mover of the supplying machine 2 and/or to actuate a suitable alarm device, not shown.

Signals which are transmitted by the sensors T8a, T8b, T8c indicate that the respective magazines 7a, 7b, 7c are empty. Absence of signals from the sensors T8a-T8c indicates that the corresponding magazines contain one or more rows of packs 1. In the absence of signals from all three sensors T8a-T8c, the computer 41 transmits a signal via conduit L whereby the output of the consuming or processing machine 3 is increased, e.g., by 20 percent. At the same time, the computer 41 transmits a signal (via conduct L or by way of another conduit) to the variable-speed prime mover 104 for the conveyor 4 so that the speed of the conveyor is increased proportionally with increased output of the processing machine 3. Still further, the absence of signals from all three sensors T8a-T8c causes the computer 41 to set up the program for transfer of rows of packs 1 from the storing unit 6 onto the conveyor 4 (refer to the preceding description of the function of photocell L4).

That signal which the computer 41 receives in response to actuation of the switch 42 (on detection of a malfunction of the processing machine 3) overrides the signal which is generated by the photocell L4 and causes the computer to set up the program for transfer of rows of packs 1 from the conveyor 4 into the storing unit 6 (refer again to the aforedescribed function of the photocell L4).

The operation is as follows:

As mentioned above, all movements are initiated in response to signals which are transmitted by the computer 41 via operational amplifier 43 and corresponding conductors A to L. The operation of the production line including the supplying machine 2, conveyor 4, processing machine 3 and storing unit 6 is normally such that the rate at which the machine 2 delivers packs 1 to the conveyor 4 matches the rate at which such packs are processed in the machine 3. Thus, the storing unit 6 is idle and the upper reach of the conveyor 4 simply transports a series of equidistant or substantially equidistant packs 1 through the clearances between the mirror symmetrical halves of the magazines 7a, 7b and 7c. As shown in FIG. 2 for the magazine 7a, the belts 9a' and 9a" can maintain the platforms 16a' and 16a" in such positions that these platforms cannot interfere with the transport of packs 1 through the storing unit 6 and on toward the inlet of the processing machine 3. Analogously, the various stops are held in retracted or inoperative positions so that the packs 1 are transported at the speed of movement of the conveyor 4.

The photocell L4 monitors the path for movement of packs with the upper reach of the conveyor 4 and transmits appropriate signals to the computer 41 during each of a series of successive intervals whose duration is determined by the computer. Thus, the photocell L4 is active at all times to indicate whether or not successive packs 1 on the conveyor 4 are separated from each other by gaps or requisite width. When the computer 41 receives such signals during each of the aforementioned intervals, the operation of the production line is "normal", and the storing unit 6 is idle.

If the processing machine 3 is defective (e.g., if the machine 3 is stopped due to a malfunction which can be detected automatically or by an attendant), the switch 42 in the conductor means u is actuated and the corresponding input of the computer 41 receives a signal. The computer 41 then initiates the transfer of rows of packs 1 into the storing unit 6 in the following way: The corresponding program involves immediate activation of the photocell L1a (i.e., the circuit of the light source of this photocell is completed by the computer). When the photocell L1a transmits a signal denoting the detection of a gap between two successive packs 1 on the corresponding section of the upper reach of the conveyor 4 ahead of the stop S1a, the computer 41 energizes the electromagnet 27a via conductor C and the arms of the stop S1a enter the thus detected gap so that the packs 1 start to pile up on the upper reach of the conveyor 4 in the interior of the magazine 7a. The photocell L2 is also activated and, as soon as it detects a gap between two adjacent packs 1 ahead of the stop S2, the computer 41 energizes the electromagnet 29 via conductor B to move the arms 32', 32" of the stop S2 to operative positions, i.e., the packs 1 begin to pile up behind the stop S2. The computer 41 further transmits a signal (via conductor J) to start the motor 18 in a direction for transfer of packs 1 from the conveyor 4 into the magazine 7a. Shortly after the stop S1a assumes its operative position, the computer 41 transmits a signal via conductor D to engage the friction clutch 22a and to thus drive the belts 9a', 9a" in a direction to move the platforms 16a' and 16a" upwardly, as viewed in FIG. 2. The rising platforms 16a', 16a" which were located at a level immediately below the path of packs on the upper reach of the conveyor 4 lift the row of packs 1 which has accumulated behind the stop S1a and transfer such row into the interior of the magazine 7a. The sensor T6a disengages the friction clutch 22a to arrest the belts 9a', 9a" when these belts advance through a distance corresponding to that between two neighboring platforms 16a' or 16a". That section of the upper reach of the conveyor 4 which is located between the two halves of the magazine 7a is then free of packs and the magazine 7a is ready to receive a group or short row of packs 1 which pile up behind the step S2. The provision of sensors T1-T4 insures that each group which is transferred into the magazine 7a, 7b or 7c contains a predetermined number of packs 1, namely, four packs.

As mentioned above, the stop S2 is held in the operative position because the electromagnet 29 is energized so that the oncoming packs 1 pile up behind the arms 32', 32". The first arrested pack 1 actuates the sensor T1, the second arrested pack actuates the sensor T2 and so forth. When all of the sensors T1-T4 are actuated, the output of the AND gate 40 transmits a signal via conductor means b whereby the computer 41 actuates the stop S3 via conductor A, i.e., the electromagnets 39', 39" are energized and the jaws 38', 38" engage and grip one or more packs 1 therebetween. Immediately thereafter, the computer 41 deenergizes the electromagnet 20 so that the arms 32', 32" of the stop S2 reassume the retracted positions of FIG. 4 and allow the freshly accumulated group or short row of four packs 1 to advance toward the stop S1a.

The sensor T5 transmits a signal when the stop S2 reassumes its inoperative position, and such signal is stored in the computer 41. When the group of packs 1 which were assembled by the stop S2 advances beyond the photocell L2, the latter transmits a signal denoting the presence of a gap behind the last pack of the group whereby the computer 41 causes the stop S2 to reassume its operative position. At the same time, the computer 41 deenergizes the electromagnets 39', 39" so that the stop S3 permits packs to advance toward the stop S2 which extends into the path of oncoming packs to accumulate a further group of four packs. The same operation is repeated again so that the stop S2 accumulates three groups of four packs each and allows each group to enter that section of the upper reach of the conveyor 4 which is located within the confines of the foremost magazine 7a. Thus, the stop S1a accumulates a longer row which consists of a series of twelve immediately adjacent packs 1. When the sensor T5 transmits the third of a series of three signals, the computer 41 energizes the friction clutch 22a with requisite delay whereby the motor 18 drives the belts 9a', 9a" to raise the platforms 16a', 16a" by one step so that two coplanar platforms 16a', 16a" transfer the freshly formed long row of twelve packs 1 into the magazine 7a, i.e., to a level above the path of packs on the upper reach of the conveyor 4.

The just described sequence of operations is thereupon repeated, i.e., the stop S1a accumulates a further long row of packs 1, such long row is transferred into the magazine 7a, the stop S1a accumulates still another row of twelve packs 1, the thus formed long row is transferred into the magazine 7a, and so forth.

When the magazine 7a is filled to capacity, the sensor T7a transmits a signal via conductor means i whereby the computer 41 deenergizes the electromagnet 27a so that the stop S1a is caused to reassume the idle position of FIG. 3. At the same time, the computer 41 energizes the electromagnet 27b to lift the stop S1b into the path of movement of packs 1 with the upper reach of the conveyor 4. The manner in which the magazine 7b is thereupon filled, either in part or to capacity, is the same as described in connection with the filling of magazine 7a. The only difference is that the computer 41 intermittently engages the clutch 22b to effect the transfer of long rows of packs 1 from the conveyor 4 into the interior of the magazine 7b. Such long rows of packs 1 are lifted off the conveyor 4 by successive pairs of coplanar platforms 16b', 16b". The delays with which the clutch 22b is engaged are longer than those which elapse prior to energization of the clutch 22a because the packs 1 which advance from the stop S2 toward the stop S1b must cover a distance which is longer than that between the stops S1a and S2.

Admission of long rows of packs 1 into the third magazine 7c is initiated by the sensor T7b which is actuated by a platform 16b' or 16b" when the magazine 7b is filled to capacity. The steps which are performed to fill the magazine 7c are the same as described in connection with the filling of magazine 7a or 7b except that the computer 41 transmits signals for appropriately delayed engagement of the friction clutch 22c.

The magazine 7c is filled to capacity only when the malfunction of the processing machine 3 is so pronounced that the operation of this machine must be interrupted for an unexpectedly long interval of time. If such a situation arises, i.e., if a platform 16c' or 16c" actuates the sensor T7c, the latter transmits a signal to the computer 41 via conductor means t whereby the computer arrests the supplying machine 2 via conductor L. At the same time or instead of arresting the machine 2, the signal which is transmitted via conductor L can trip a suitable alarm device, not shown. This alerts the attendant or attendants so that the oncoming cigarette packs 1 can be removed from the conveyor 4 by hand in front of the storing unit 6. As a rule, the combined capacity of magazines 7a to 7c suffices to insure temporary storage of all packs 1 which are delivered by the machine 2 during a relatively short interruption (or even during a longer-lasting interruption) of operation of the processing machine 3 so that the need to remove packs by hand arises infrequently or not at all.

In order to insure that the storing unit 6 is always ready to accept one or more long rows of packs 1, i.e., that the computer 41 can initiate the transfer of packs into one of the magazines 7a to 7c as soon as the switch 42 is actuated, the admission of a first long row of packs 1 into the magazine 7a and the resulting deactivation of the sensor T8a sets up a program for transfer of packs from the storing unit 6 back onto the upper reach of the conveyor 4. When the computer 41 receives a signal via conductor means g, one of its outputs transmits a signal to the processing machine 3 via operational amplifier 43 and conductor K so as to increase the output of the machine 3, e.g., by 20 percent. As mentioned above, this also entails a corresponding acceleration of the variable-speed prime mover 104 for the conveyor 4. It is clear that, if the conductor K transmits a signal while the machine 3 is idle, acceleration of the machine 3 for operation at a higher output begins only after the cause of malfunction of this machine is eliminated. However, if the transfer of packs 1 into the storing unit 6 was initiated by the photocell L4, i.e., not in response to actuation of the switch 42, the output of the processing machine 3 is increased immediately. The aforementioned program for transfer of packs from the storing unit 6 onto the conveyor 4 is delayed if the accumulation of a long row of packs 1 for transfer into the magazine 7a, 7b or 7c is still in progress. If the photocell L4 thereupon signals the detection of a gap of requisite width, the computer 41 activates the photocell L2 so that the latter causes the stop S2 to assume its operative position as soon as the photocell L2 detects a gap which is wide enough to provide room for the arms 32' and 32" of the stop S2. If only the sensor T8a is deactivated, i.e., if only the magazine 7a contains one or more long rows of packs 1, the computer 41 activates the photocell L3a. If the magazine 7b also contains one or more long rows of packs 1, i.e., if the sensor T8b is not engaged by the nearest platform 16b' or 16b", the computer 41 activates the photocell L3b instead of the photocell L3a. Analogously, the computer 41 activates the photocell L3c if the sensor T8c is not engaged by the nearest platform 16c' or 16c". It is now assumed that the magazines 7a and 7b are filled to capacity and that the magazine 7c also contains one or more long rows of packs 1. The photocell L3c then transmits a signal when it detects that the conveyor section in the magazine 7c is free of cigarette packs, i.e., when all of the packs which have advanced beyond the stop S2 are located downstream of the storing unit 6 and advance toward the processing machine 3. The motor 18 is then driven in a direction to effect the transfer of packs 1 from the storing unit 6 onto the conveyor 4. Therefore, when the friction clutch 22c is engaged, the belts of the magazine 7c are driven in a direction to move the platforms 16c' and 16c" downwardly. This results in deposition of the lowermost long row of packs 1 (which were stored in the magazine (7c) onto the upper reach of the conveyor 4 which transports the packs toward the processing machine 3. The friction clutch 22c is disengaged by the sensor T6c and the stop S2 is retracted to its inoperative position. Therefore, the conveyor 4 is free to transport those packs which were caused to pile up behind the stop S2. The photocell L4 transmits a signal as soon as the pileup is eliminated, i.e., as soon as the packs which were intercepted by the stop S2 advance beyond that portion of the path which is monitored by the photocell L4. Such signal entails a repetition of the just described operation, i.e., the magazine 7c is relieved of an additional long row of packs 1 which are deposited on the upper reach of the conveyor 4 for transport toward the processing machine 3.

When the magazine 7c is empty, the sensor T8c transmits a signal to initiate the evacuation of long rows of cigarette packs from the magazine 7b. Once the magazine 7b is empty, the sensor T8b transmits a signal for evacuation of the contents of the magazine 7a. The clutch 22b is engaged at intervals during evacuation of the contents of the median magazine 7b, and the clutch 22a is engaged at requisite intervals during removal of long rows of packs from the magazine 7a. When the magazine 7a is empty, the sensor T8a transmits a signal to deactivate the photocell L2 and to thus retract the stop S2 to the illustrated inoperative position. At the same time the computer 41 transmits a signal to reduce the output of the processing machine 3 by 20 percent, i.e., the requirements of this machine then match the output of the supplying machine 2.

The just described program for automatic transfer of packs 1 from the storing unit 6 onto the conveyor 4 insures that the storing unit tends to remain empty, i.e., that the storing unit is always ready to accept packs as soon as the processing machine 3 is arrested as well as when the attendants place additional packs onto the conveyor 4 ahead of the foremost magazine 7a in order to deplete or eliminate the supply of packs which were removed during a long-lasting interruption of operation of the machine 3.

Another prerequisite for permanent readiness to store packs 1 in the unit 6 is the presence of gaps between the packs in the region of the stop S2, i.e., the photocell L2 should be able to initiate the lifting of arms 32', 32" into the path of movement of packs on the upper reach of the conveyor 4. Moreover, the width of such gaps should be sufficient to allow for unimpeded movement of arms 32', 32" to their operative positions. The width of gaps is monitored by the photocell L4 whose light source emits a light beam substantially diagonally across the space above the upper reach of the conveyor 4. In normal operation, the machine 2 supplies packs 1 at such a rate that the width of gaps between successively supplied packs meets the requirement for introduction of arms 32', 32" into the gap thereabove. However, and as mentioned above, it can happen (from time to time) that the attendants must remove a certain number of packs when the magazines 7a-7c are filled and the processing machine 3 is idle. The thus removed packs must be returned onto the conveyor 4 sooner or later. The previously removed packs are inserted into the gaps between the packs which are supplied by the machine 2. This means that the manually inserted packs fill or nearly fill the gaps between the packs which are supplied by the machine 2. Consequently, the photocell L4 fails to deliver signals within the intervals which are determined by the computer 41. The result is that the computer 41 sets up the program for transfer of packs 1 into the storing unit 6. As already explained, the first to be filled is the magazine 7a. If the magazine 7a is already filled or is filled after the program for transfer of packs into the storing unit 6 is started, the packs are delivered into the magazine 7b and, when the magazine 7b is filled, into the magazine 7c. Admission of packs into the magazine 7a is started by raising the stop S1a. When the photocell S2 detects the next gap (such gaps must be present behind the photocell L4), the arms 32', 32" of the stop S2 are lifted so that the stop S2 begins to accumulate a short row or group of packs in the region of the sensors T1-T4. The packs which are arrested by the stop S1a are transferred into the magazine 7a while the sensors T1 to T4 count the packs which are intercepted by the stop S2. When the sensor T4 is actuated, the computer 41 actuates the stop S3 and the stop S2 is returned to inoperative position so as to permit the freshly formed (short) row or group for four packs to advance toward the stop S1a. The assembly of a long row of twelve packs continues and is completed even if the photocell L4 detects a gap before a row of twelve packs accumulates behind the stop S1a. Thus, once the assembly of a long row is started, such row is completed and transferred into the corresponding magazine. Of course, the transfer of a single long row of packs into a magazine sets up the program for evacuation of packs from the storing unit 6, and the computer causes the processing machine 3 to increase its output by 20 percent. The speed of the conveyor 4 also increases which, in turn, insures the formation of gaps whose width suffices to initiate the generation of a signal via photocell L4. Thus, the transfer of packs into the storing unit 6 is terminated because the photocell L4 has detected a gap of requisite width. As mentioned above, the assembly and transfer of a long row into the storing unit 6 continues even if the photocell L4 detects a gap of requisite width before such assembly is completed. The just described part of the program insures that a gap is formed, at least behind each group of packs which is intercepted by the stop S3, so that the stop S2 can be moved to operative position. If the switch 42 transmits a signal during the interval of assembly and transfer of a long row of packs 1 into one of the magazines 7a-7c (because the machine 3 is arrested), such operation is completed even in the absence of gaps between neighboring packs.

An important advantage of the improved apparatus is that at least the majority of receptacles 17a (17b, 17c) invariably receive rows such each of which contains a predetermined number of packs 1 or other commodities, even if the length of certain commodities deviates from a predetermined value. This is achieved by the provision of sensors T1-T4 which are positioned in such a way that each thereof detects a discrete pack 1 even if one or more packs which pile up behind the stop S2 are longer or shorter than anticipated. The sensor T4 is not immediately adjacent to the stop S3 but the latter is sufficiently close to the sensor T4 to intercept a pack 1 which tends to advance toward the sensor T4 when this sensor is already actuated by a pack therebelow. Since the length of that section of the upper reach of the conveyor 4 which is located within the confines of the magazine 7a, 7b or 7c is a multiple of the combined length of the maximum number of packs which can be intercepted by the stop S2, the magazines can store long rows of packs even though each movement of the stop S2 to operative position entails the accumulation of a relatively short group of commodities. The length of packs 1 is measured in the direction of travel of the upper reach of the conveyor 4.

Another important advantage of the improved apparatus is that the operation of the storing unit 6 is not dependent on the rate at which the machine 2 supplies packs 1 to the conveyor 4. Thus, once the storing unit 6 is actuated by the computer 41, it performs its operation (storage of at least one long row of packs 1 or delivery of at least one long row of packs onto the conveyor 4) irrespective of the momentary output of the machine 2. Furthermore, the storing unit 6 can accept packs 1 in immediate response to transmission of a corresponding signal, e.g., in immediate response to stoppage of the processing machine 3. Delayed activation of the storing unit 6 would necessitate the provision of a buffer or auxiliary magazine between the magazine 7c and the machine 3. This, in turn, would render it necessary to lengthen that portion of the conveyor 4 which extends between the storing unit 6 and the processing station. Instead of resorting to an auxiliary magazine, it is presently preferred to employ a larger storing unit, i.e., to utilize a storing unit with a larger number of discrete independently operable magazines or to employ a storing unit with relatively long magazines each of which can store long rows of packs 1 or other commodities. Immediate activation of the storing unit 6 is attributable to the provision of photocells L1a-L1c which detect the presence of a gap ahead of the respective first stop S1a-S1c practically without any delay to thus insure that the corresponding stop can move to operative position and begin to intercept the oncoming packs as soon as the computer 41 receives a signal via switch 42 or photocell L4.

The second stop S2 insures that the operation of the storing unit 6 is independent of the length of packs 1. This stop is moved to operative position to proceed with the accumulation of a first group of packs in the region of the sensors T1-T4 simultaneously with or immediately after lifting of the first stop S1a, S1b or S1c. The stop S2 insures that the conveyor 4 does not accumulate an excessive number of packs behind the stop S1a, S1b or S1c when the computer 41 transmits a signal for transfer of packs from the conveyor 4 into the corresponding magazine 7a, 7b or 7c. Once the stop S2 is moved to operative position before the stop S1a, S1b or S1c accumulates not more than twelve packs, the number of packs which are admitted into the magazine 7a, 7b or 7c thereafter is under full control because the stop S2 accumulates groups of four packs each and the platforms in the magazine 7a, 7b 7c transfer successive long rows of packs into the space above the upper reach of the conveyor 4 as soon as a long row contains twelve (or another selected number of) packs. This is attributable to the provision of the third stop S3 which cooperates with the second stop S3 in the accumulation of groups of four packs each. Timely movement of the second stop S2 to its operative position after movement of the stop S1a, S1b or S1c to operative position is insured by the provision of photocell L2 which monitors the path for the packs 1 immediately ahead of the stop S2 and causes the computer 41 to energize the electromagnet 29 as soon as the foremost gap (detected by the photocell L2) moves into register with the arms 32', 32".

Still another advantage of the improved apparatus is that it can accumulate long rows of packs for transfer into the magazine 7a, 7b or 7c in spite of the fact that the distance between the foremost magazine 7a and the supplying machine 2 is short (or need not be long). Shortening of the distance between the storing unit 6 and the supplying station is desirable and advantageous because this contributes to compactness of the production line. Moreover, and if there is room for a relatively long path along which the packs from the machine 2 to the foremost magazine 7a, such path is preferably shortened and the length of the storing unit is increased accordingly so that this unit can accumulate a large number of packs in order to satisfy the demands of the machine 3 when the machine 2 is idle. The just discussed advantage of the improved apparatus is attributable to the aforediscussed feature that the combined length of packs which are intercepted by the stop S2 is a multiple of the length of a single pack but only a fraction of the length of a magazine, as considered in the direction of movement of the upper reach of the conveyor 4. The relatively simple stop S3 is amply sufficient and quite satisfactory to insure that the transport of packs toward the stop S2 is interrupted when the latter accumulates a group of four packs and is moved to inoperative position in order to enable the freshly accumulated group to advance toward and to be arrested by the stop S1a, S1b or S1c. The distance between the stops S2 and S3 suffices to enable the stop S2 to accumulate groups of four packs each, even if the length of one or more packs in a group exceeds the expected length. It will be readily appreciated that the stop S3 can be simplified still further by providing it with a fixed and a movable jaw, i.e., by omitting one of the electromagnets 39', 39".

The photocell L4 monitors the path ahead of the stop S3 for the presence of absence of gaps. As mentioned above, the computer 41 reacts to signals which denote the presence as well as to signals which denote the absence of gaps in the region which is monitored by the photocell L4. Thus, a signal denoting the absence of gaps initiates the transfer of packs into the storing unit 6 and a signal denoting the presence of gaps initiates the transfer of packs from a magazine into the path which is defined by the upper reach of the conveyor 4. If the storing unit 6 were to comprise a single magazine whose length would match the combined length of magazines 7a-7c, it would be necessary to provide on the conveyor a gap of substantial length in order to allow for transfer of a very long row of packs from a relatively long single magazine back onto the conveyor 4. Therefore, it is presently preferred to assemble the storing unit 6 of several relatively short magazines so that the length of rows which are transferred into or removed from a magazine is not excessive. The magazines of the storing unit can be placed into immediate proximity of each other because the first stops S1a-S1c are installed in (i.e., within the confines of) the respective magazines 7a-7c and the stops S2 and S3 are common to all three magazines, i.e., there is no need to install a second and/or a third stop between the magazines 7a, 7b or 7b, 7c. The stops S1a-S1c and photocells L1a-L1c insure that each magazine can receive or discharge rows of packs independently of the other two magazines.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution of the art and, therefore, such adaptations should and are intended to be comprehended within the meaning and range of equivalence of the claims.

We claim:

1. Apparatus for temporary storage of rows of discrete commodities which are transported by a conveyor in a predetermined direction along a predetermined path from a supplying to a processing station, comprising a storing unit having at least one magazine adjacent to a predetermined section of said path and including means for transferring rows of commodities from and back into said section; a first blocking device located at the downstream end of said section and movable into said path to intercept an oncoming commodity whereby the next-following commodities pile up behind the intercepted commodity to form a growing row; a second blocking device located ahead of said section and movable into said path to intercept an oncoming commodity whereby the next-following commodities pile up behind such intercepted commodity; a third blocking device located ahead of said second device and movable into said path to arrest an oncoming commodity; means for counting the number of commodities which are piled up by said second device; and means for respectively moving said second and third devices substantially simultaneously from and into said path when said number reaches a predetermined value so that said conveyor is free to transport such number of commodities beyond said second and toward said first device while said third device prevents commodities from advancing toward said second device.

2. Apparatus as defined in claim 1, wherein the commodities in said path are normally separated from each other by gaps wide enough to permit entry of said first blocking device into said path between a pair of neighboring comoditities, and further comprising signal generating means for monitoring said path for the presence of said gaps ahead of said first device and means for moving said first device into said path in response to a signal from said monitoring means.

3. Apparatus as defined in claim 1, wherein the commodities in said path are normally separated from each other by gaps wide enough to permit entry of said second blocking device into said path between a pair of neighboring commodities, and further comprising signal generating means for monitoring said path for the presence of said gaps ahead of said second device and means for moving said second device into said path in response to a signal from said monitoring means.

4. Apparatus as defined in claim 1 for temporary storage of commodities having a predetermined length, as considered in said direction, wherein the distance between said second and third blocking devices, as considered in said direction, is a multiple of said predetermined length but only a fraction of the length of said section.

5. Apparatus as defined in claim 1, wherein said third blocking device comprises a pair of jaws located at the opposite sides of said path and said moving means comprises means for moving at least one of said jaws toward the other of said jaws to thereby clamp at least one commodity therebetween.

6. Apparatus as defined in claim 1, wherein the commodities in said path are normally separated from each other by gaps and further comprising signal generating means for monitoring said path for the presence of said gaps ahead of said third blocking device.

7. Apparatus as defined in claim 1, wherein said storing unit further comprises a second magazine adjacent a second section of said path downstream of said first mentioned section and including means for transferring rows of commodities from and back into said second section, and a further blocking device located at the downstream end of said second section and movable into said path to intercept an oncoming commodity in the inoperative position of said first device whereby the next-following commodities pile up on said conveyor behind the commodity which is intercepted by said further device.

8. Apparatus as defined in claim 7, wherein the commodities in said path are normally separated from each other by gaps wide enough to permit entry of said further blocking device into said path between a pair of neighboring commodities, and further comprising signal generating means for monitoring said second section for the presence of gaps ahead of said further device and means for moving said further device into said path in response to a signal from said monitoring means.

9. Apparatus as defined in claim 7, wherein said second and third blocking devices are common to said first mentioned and second magazines.

10. Apparatus as defined in claim 1, further comprising signal generating means for monitoring the extent to which said section is filled with commodities.

11. Apparatus as defined in claim 1, wherein said commodities have a predetermined width, as considered transversely of said direction, and said transferring means includes first and second carriers disposed at the opposite sides of said section, means for moving said carriers stepwise up and down in synchronism with each other, and pairs of spaced-apart coplanar platforms defining receptacles for rows of commodities, the distance between a pair of coplanar platforms being less than said width and the width of said conveyor being less than said distance.

12. Apparatus as defined in claim 11, wherein each of said carriers comprises a plurality of endless flexible conveying elements disposed in parallel vertical planes.

13. Apparatus as defined in claim 1, wherein said conveyor is a continuously driven endless conveyor having an elongated upper reach which transports the commodities along said path.

14. Apparatus as defined in claim 1, wherein each of said first and second blocking devices comprises a pair of arms disposed at the opposite sides of said section and being movable upwardly into and downwardly from said path.

* * * * *